(12) United States Patent
Suzuki et al.

(10) Patent No.: US 7,995,805 B2
(45) Date of Patent: Aug. 9, 2011

(54) IMAGE MATCHING APPARATUS, IMAGE MATCHING METHOD, COMPUTER PROGRAM AND COMPUTER-READABLE STORAGE MEDIUM

(75) Inventors: Takashi Suzuki, Kawasaki (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1013 days.

(21) Appl. No.: 11/847,317

(22) Filed: Aug. 29, 2007

(65) Prior Publication Data

US 2008/0219516 A1    Sep. 11, 2008

(30) Foreign Application Priority Data

Aug. 30, 2006  (JP) ................. 2006-234360

(51) Int. Cl.
G06K 9/00 (2006.01)
G06K 9/62 (2006.01)
G06K 9/40 (2006.01)

(52) U.S. Cl. .......... 382/118; 382/209; 382/274

(58) Field of Classification Search .......... 382/118, 382/209, 218, 224, 197, 274, 300
See application file for complete search history.

(56) References Cited

U.S. PATENT DOCUMENTS

| | | | |
|---|---|---|---|
| 5,164,992 A | 11/1992 | Turk | |
| 5,995,639 A * | 11/1999 | Kado et al. | 382/118 |
| 6,356,659 B1 | 3/2002 | Wiskott | |
| 6,753,856 B1 * | 6/2004 | Krah et al. | 345/204 |
| 6,817,721 B1 * | 11/2004 | Ulichney et al. | 353/69 |
| 7,039,233 B2 | 5/2006 | Mori et al. | |
| 7,054,850 B2 | 5/2006 | Matsugu | |
| 7,130,453 B2 * | 10/2006 | Kondo et al. | 382/117 |
| 7,274,819 B2 | 9/2007 | Matsugu | |
| 7,679,778 B2 * | 3/2010 | Aoyama | 358/1.9 |
| 7,778,467 B2 * | 8/2010 | Iizuka | 382/209 |
| 2004/0201782 A1 * | 10/2004 | Murai et al. | 348/700 |
| 2005/0102376 A1 * | 5/2005 | Ichikawa | 709/219 |
| 2005/0248812 A1 * | 11/2005 | Udagawa et al. | 358/3.01 |
| 2005/0276481 A1 * | 12/2005 | Enomoto | 382/190 |
| 2006/0074653 A1 | 4/2006 | Mitari et al. | |
| 2006/0115157 A1 | 6/2006 | Mori et al. | |
| 2006/0204053 A1 | 9/2006 | Mori et al. | |
| 2006/0228005 A1 | 10/2006 | Matsugu et al. | |
| 2007/0242856 A1 | 10/2007 | Suzuki et al. | |

FOREIGN PATENT DOCUMENTS

| | | |
|---|---|---|
| JP | 2000-030065 | 1/2000 |
| JP | 2004-145576 | 5/2004 |

OTHER PUBLICATIONS

Matsugu et al., "Convolutional Spiking Neural Network Model for Robust Face Detection", International Conference on Neural Information Processing (ICONIP02), 2002.

* cited by examiner

*Primary Examiner* — Daniel G Mariam
(74) *Attorney, Agent, or Firm* — Fitzpatrick, Cella, Harper & Scinto (57) ABSTRACT

An image matching apparatus comprising, a detector adapted to detects, from an input image containing an object to be matched, a region where the object exists, an estimation unit adapted to estimates a parameter regarding a displaying characteristic based on an image of the region, a correction unit adapted to corrects the displaying characteristic of the input image based on the parameter, and a matching unit adapted to matches the corrected input image containing the object to be matched with an image containing a matching object.

12 Claims, 10 Drawing Sheets

HIGH-ORDER FEATURE VECTOR : $F_h=(F_1, F_2, F_3)$

FIG. 9A

$f_n$ : LUMINANCE VALUE
F : FEATURE VECTOR OF CERTAIN LOCAL REGION 901
$F=(f_1, f_2, \cdots f_n)$

IMAGE MATCHING APPARATUS, IMAGE MATCHING METHOD, COMPUTER PROGRAM AND COMPUTER-READABLE STORAGE MEDIUM

BACKGROUND OF THE INVENTION

1. Field of the Invention

The present invention relates to an image matching apparatus, image matching method, and computer program.

2. Description of the Related Art

An image recognition processing method has been proposed, which executes pattern recognition of an object by extracting feature amounts from an image containing the object. This image recognition processing method is usable, for example, for person recognition based on an acquired face image. The person recognition based on a face image has received attention as a technique which allows non-contact recognition, unlike fingerprint recognition or vein recognition, and places no restrictions on the target's action.

Approaches to person recognition based on a face image are roughly classified into two schemes. The first approach is a "pattern matching method" which captures a face as an image pattern expressed by two-dimensionally arraying the grayscale values of pixels and executes matching of the pattern. The second approach is a "feature-based method" which recognizes a person by extracting feature points representing features such as eyes, mouth, and nose in a face and executing matching of feature vectors that express the shapes of the features and their special layout relationship as numerical values.

The contents of techniques representative of the approaches will be briefly described below.

A representative example of the pattern matching method is an eigenface method using principal component analysis (PCA) (U.S. Pat. No. 5,164,992). The fundamental outline of the eigenface method will be explained below. In the eigenface method, PCA is applied to the grayscale value patterns of a number of face images, thereby obtaining an orthogonal normal basis called an eigenface.

KL (Karhunen-Loeve) expansion is executed for the grayscale pattern of an arbitrary face image by using the orthogonal normal basis, thereby obtaining the dimensionally compressed vector of the pattern. Finally, this vector is defined as a feature vector for recognition. Recognition is done by statistic processing between feature vectors of an input pattern and those of a registration pattern registered in advance. The fundamental outline of the eigenface method has been described above.

A representative example of the second approach—the feature-based method—is a technique based on a dynamic link architecture (U.S. Pat. No. 6,356,659). A fundamental outline of this technique will be described below. This technique applies a Gabor filter to extract the periodicity and directivity of each grayscale feature on a number of sample points (e.g., the contours of eyes, mouth, nose, and face) set on a face pattern and uses local texture information as feature vectors.

In addition, a graph which associates each sampling point with a node is obtained. The graph is formed by using the spatial layout information of the sampling points and feature vectors serving as the attribute values of the nodes corresponding to the sampling points. A recognition process is performed by dynamically deforming the spatial layout information between the nodes and selecting a registered pattern having the highest similarity between the graph of an input pattern and the graph of registered patterns which are registered in advance.

The fundamental outline of the technique based on dynamic graph matching has been described above. Not only techniques based on these approaches but also various derivative face recognition techniques have also been developed.

The accuracy of face recognition based on a face images as one of the image matching technologies largely depends on geometric variations caused by the difference in the posture or the image sensing direction of a target object and optic variations caused by differences in illumination conditions. For the purpose of eliminating the influence of optic variations, an image matching apparatus, image matching method, and image matching program as described in Japanese Patent Laid-Open Nos. 2004-145576 and 2000-30065 have been proposed.

Japanese Patent Laid-Open No. 2004-145576 discloses a technique which acquires knowledge to remove illumination variations from a plurality of arbitrary images by learning in advance. On the basis of the knowledge about the illumination variations obtained by learning, feature amounts without the influence of illumination variations are extracted from an input image and a registered image and compared with each other. The learning process for obtaining knowledge regarding illumination variations is executed by the steps of reducing the resolution of the training image or extracting a low frequency component from the training image and constructing a subspace by generating an illumination feature vector from the low resolution image or low frequency image.

On the other hand, Japanese Patent Laid-Open No. 2000-30065 discloses, as a face recognition method robust to illumination variations, a constrained mutual subspace method which expands a mutual subspace method having high tolerance to deformations of a face pattern. The constrained mutual subspace method generates an input subspace based on a plurality of face patterns obtained from a moving image sequence and identifies, as a similarity, the angle made by the generated input subspace and registrant dictionary subspace generated in advance from a moving image sequence of the registrant. The constrained mutual subspace method projects the input subspace and registrant subspace in the mutual subspace method on a subspace without illumination variations (Kazuhiro Fukui et al, "Face Image Recognition Which Uses Mutual Constrained Subspace Method and is Robust to Environmental Variations", IEICE Transactions D-II Vol. J82-DII, No. 4, pp. 613-620) and identifies, as a similarity, the angle made by the input subspace and registrant subspace projected on the subspace.

The subspace without illumination variations is generated in the following way. A moving image sequence is sensed for a plurality of persons under the same illumination condition. In correspondence with all combination pairs of persons, a subspace is generated from the moving image of each person. A difference subspace of this subspace is generated, and the subspace without illumination variations is generated from the difference subspace.

As described above, it is possible to acquire knowledge to remove the influence of illumination variations from a plurality of image data by learning and remove the illumination variations from an input image based on the knowledge, thereby providing face recognition robust to illumination variations.

However, to ensure high robustness to illumination variations depending on learning, a sufficient number of training samples are necessary. Additionally, the sufficient number of samples is generally unknown. Furthermore, recognition performance depends on the learning pattern. The load related to learning is heavy.

SUMMARY OF THE INVENTION

The present invention provides an image matching method, for example a face recognition method, robust to illumination variations by using a technique independent of learning.

According to one aspect of the present invention, an image matching apparatus comprising, a detector adapted to detects, from an input image containing an object to be matched, a region where the object exists, an estimation unit adapted to estimates a parameter regarding a displaying characteristic based on an image of the region, a correction unit adapted to corrects the displaying characteristic of the input image based on the parameter, and a matching unit adapted to matches the corrected input image containing the object to be matched with an image containing a matching object.

Further features of the present invention will become apparent from the following description of exemplary embodiments with reference to the attached drawings.

DESCRIPTION OF THE EMBODIMENTS

The embodiments of the present invention will be described below with reference to the accompanying drawings.

In a fundamental embodiment of the present invention, first, a predetermined object is extracted from an image containing objects. Correction is executed such that a predetermined status value of a final output result or intermediate output result generated in the process of extracting the object is almost equal between input images. The influence of illumination variations of the input images is minimized as much as possible for all input images so that the illumination variations have almost the same level. Then, matching of the input images is executed.

Figure 1:
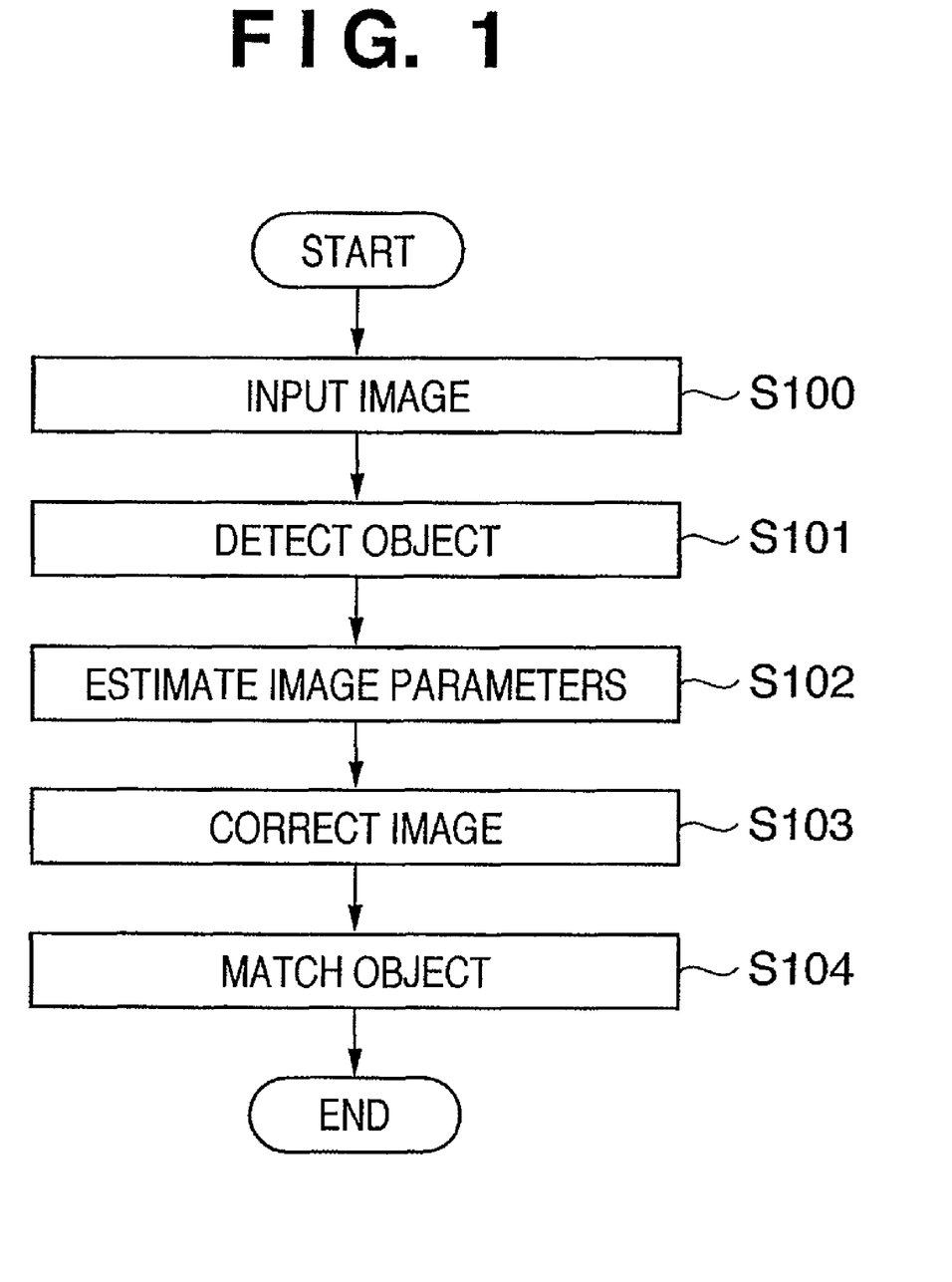
FIG. 1 is a flowchart for explaining the overview of an image matching process according to an embodiment of the present invention.

An image matching process according to an embodiment of the present invention will be described first with reference to FIG. 1. FIG. 1 is a flowchart illustrating an example of an image matching process according to an embodiment of the present invention.

Referring to FIG. 1, in step S100, an image containing an object (object to be matched) as a matching target is input. In step S101, an object region including the object is extracted from the input image. In step S102, image parameters are estimated in the object region extracted in step S101. In step S103, the input image is corrected based on the image parameters estimated in step S102. In step S104, the input image corrected in step S103 is compared/matched with a new image obtained in accordance with the same process procedure as described above. This process enables image matching without any influence of illumination variations.

Figure 2:
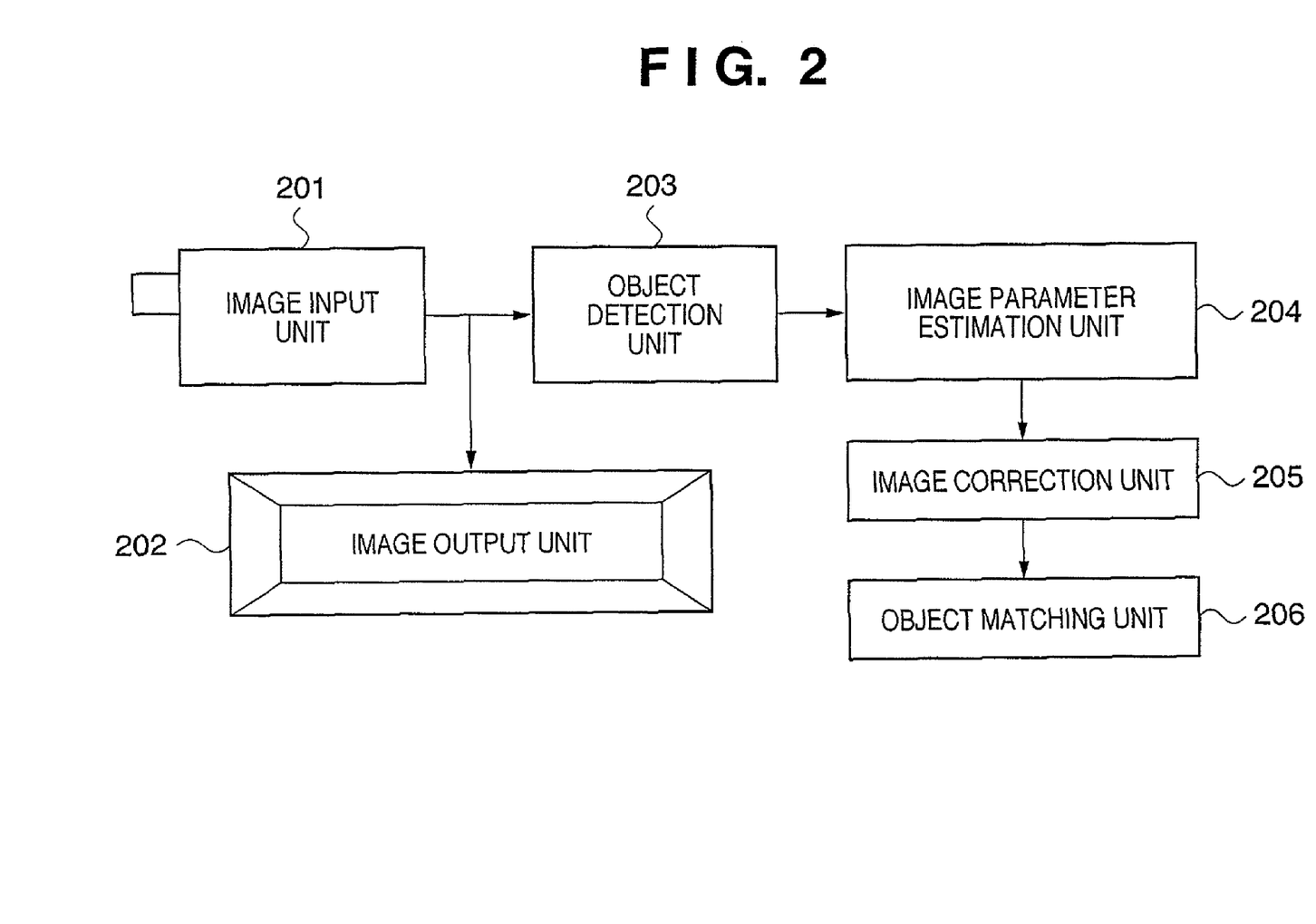
FIG. 2 is a functional block diagram of an image matching apparatus according to an embodiment of the present invention.

An example of the arrangement of an image matching apparatus serving as an image processing apparatus according to the embodiment of the present invention will be described next with reference to FIG. 2. FIG. 2 is a functional block diagram of an image matching apparatus serving as an image processing apparatus.

An image input unit 201 including a lens and an imaging element such as a CCD or CMOS sensor has a function of sensing an object and inputting image data to the image matching apparatus. An image output unit 202 has a function of outputting the image data input by the image input unit 201 to an external display device such as a CRT or LCD. An object detection unit 203 including a dedicated chip such as a neurochip simulating a human neural circuit or a general-purpose chip such as an FPGA or ASIC has a function of detecting an object from the image.

An image parameter estimation unit 204 including a processor dedicated to image processing or a general-purpose processor has a function of estimating the image parameters of the input image based on an output result regarding object detection from the object detection unit 203. An image correction unit 205 including a processor dedicated to image processing or a general-purpose processor, like the image parameter estimation unit 204, corrects the input image based on the image parameters from the image parameter estimation unit 204.

An object matching unit 206 including a processor dedicated to image processing or a general-purpose processor, like the image parameter estimation unit 204 and image correction unit 205, has a function of comparing/matching the input image with another image that is similarly processed by the above-described process blocks.

In the image matching apparatus, the image input unit 201 to object matching unit 206 may be integrated in a single device. In that case, the process functions of the blocks may be implemented by using software modules. Alternatively, the image input unit 201 may be formed from a digital camera while the image output unit 202 to object matching unit 206 may be formed from an information processing apparatus such as a personal computer.

First Embodiment

Figure 3:
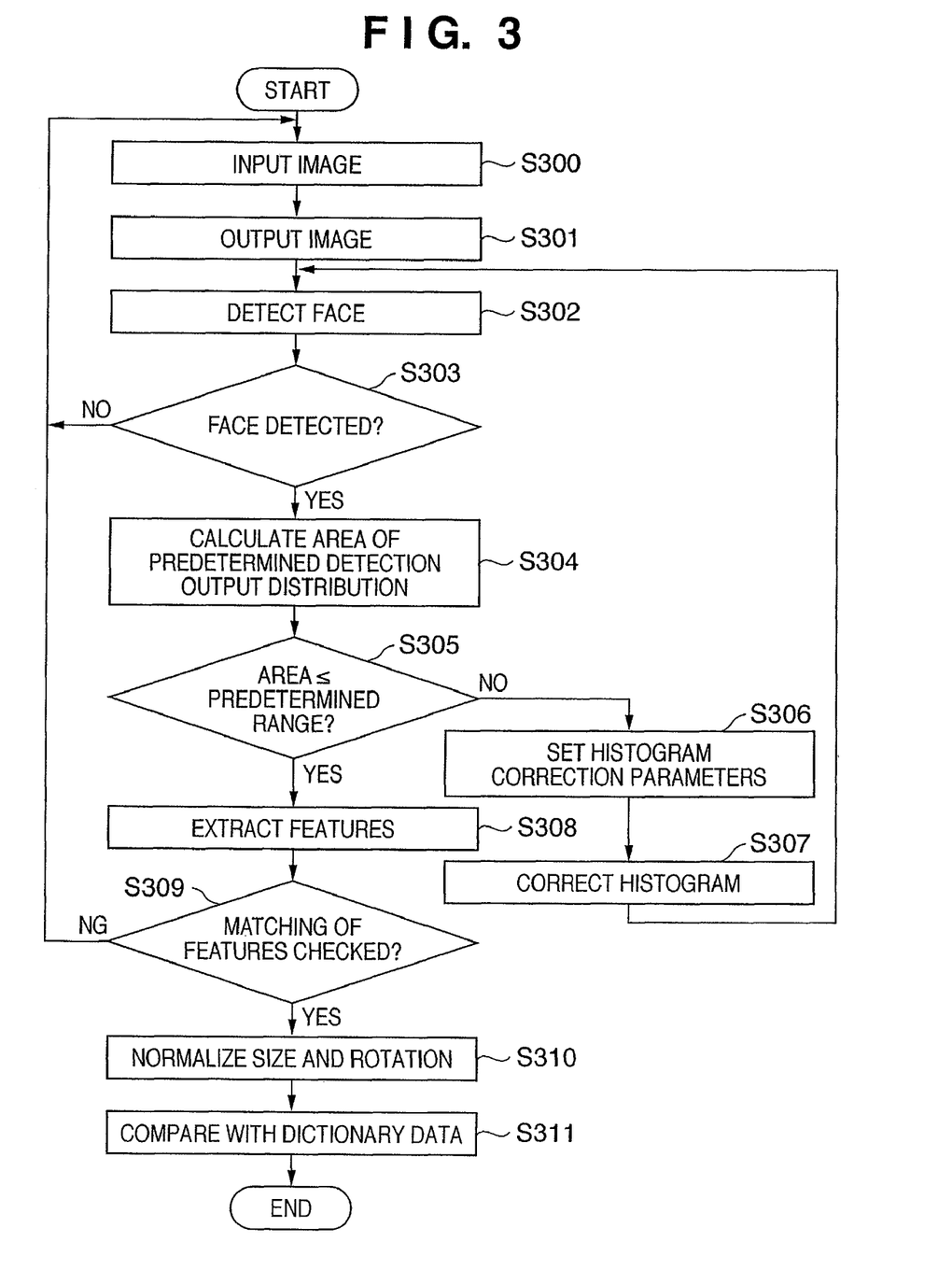
FIG. 3 is a flowchart illustrating details of an example of an image matching process according to the first embodiment of the present invention.

The first embodiment of the present invention will be described next. In the first embodiment, a face recognition system for identifying a person based on a face in an image by using an image matching method will be described. FIG. 3 is a flowchart illustrating an example of processing according to this embodiment.

Referring to FIG. 3, in step S300, image data containing a recognition target is input by using an image input unit 201. In step S301, the input image data is output to an external display device and displayed on its screen by using an image output unit 202.

In step S302 the face region of the recognition target contained in the image data is detected by using an object detection unit 203. Face region detection can be done by causing the user to input a position designation of a part corresponding to the face region in the image data displayed on the external display device by using an operation unit such as a pointing device provided on the image matching apparatus serving as an image processing apparatus. The face region may be detected by a known template matching technique using a filter such as a face detection template.

In this embodiment, face detection is executed by using a face detection technique based on a neural network. In face detection determination in step S303, the object detection unit 203 determines that a face is detected when a neuron firing distribution exceeds a predetermined value. A face detection neural network used in this embodiment will briefly be described with reference to FIG. 4. Details are described, for example, in M. Matsugu, K. Mori, et al., "Convolutional Spiking Neural Network Model for Robust Face Detection", 2002, International Conference On Neural Information Processing (ICONIP02).

Figure 4:
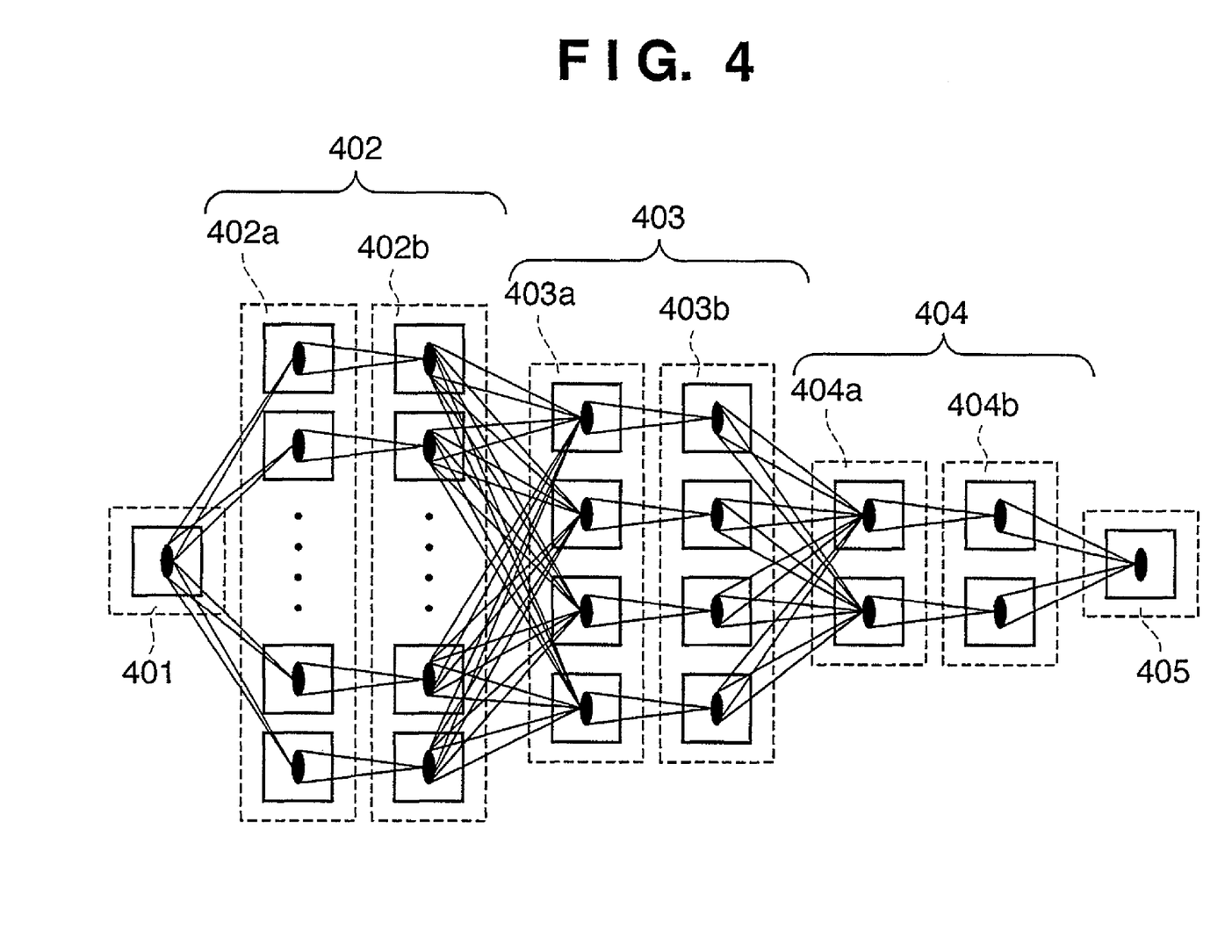
FIG. 4 is a view showing an example of a hierarchical neural network for face detection according to the first embodiment of the present invention.

The face detection neural network used in this embodiment employs a hierarchical structure and has a process step of recognizing features from a low-order feature to a high-order feature, sequentially.

Referring to FIG. 4, input image data 401 is image data used as a face detection process target. The input image data 401 is input to a first layer level 402. The first layer level 402 includes detection modules 402a and integration modules 402b. First, the detection modules 402a extract primitive (low-order) first feature information from the input image data 401. The first feature information is, for example, edge information in the input image data 401. The integration modules 402b integrate the pieces of feature information such as edge information extracted by the detection modules 402a and transfer the integration results to a second layer level 403.

The second layer level 403 detects higher-order second feature information by using the feature information detected in the first layer level 402. The second feature information includes, for example, V-shaped edges forming lateral and medial canthi and mouth corners. The second layer level 403 also includes detection modules 403a and integration modules 403b. The integration modules 403b integrate detection results in the detection modules 403a.

The second layer level 403 connects to a third layer level 404. The third layer level 404 extracts higher-order third feature information by using the integration result in the second layer level 403. The third feature information includes edges that form a region related to a specific part and, more specifically, edges forming eyes and mouth and edges forming the shadow of a nose. The third layer level 404 also includes detection modules 404a and integration modules 404b. The integration modules 404b integrate detection results in the detection modules 404a.

Finally, a fourth layer level 405 detects a face by using the integration result in the third layer level 404.

Figure 5:
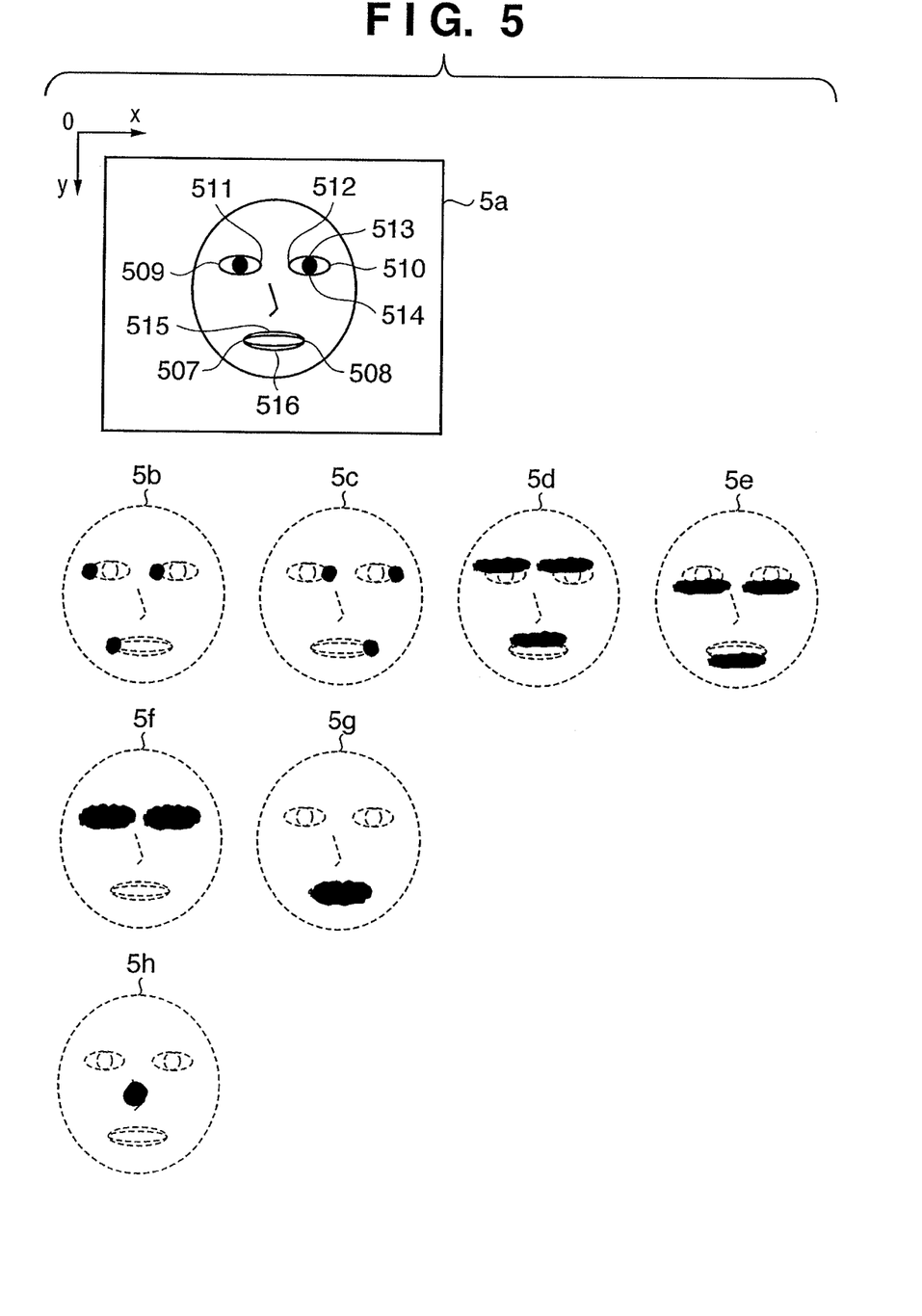
FIG. 5 are views showing examples of a detection output distribution detected by the hierarchical neural network according to the first embodiment of the present invention.

Features detected by face detection will be described next with reference to FIG. 5. FIG. 5 includes views for explaining face detection according to this embodiment. Referring to 5a in FIG. 5, the features of a face are classified into a left mouth corner point 507, right mouth corner point 508, left lateral canthus 509, right lateral canthus 510, left medial canthus 511, right medial canthus 512, upper eyelid 513, lower eyelid 514, upper lip 515, and lower lip 516. An X-Y coordinate system having an origin O at the center is set to define the directivity to specify the upper, lower, left, and right directions of the features of the face. More specifically, in face detection, the "left (direction)" corresponds to the negative (decreasing) direction of the X-axis. The "right (direction)" corresponds to the positive (increasing) direction of the X-axis. The "upper (direction)" corresponds to the negative (decreasing) direction of the Y-axis. The "lower (direction)" corresponds to the positive (increasing) direction of the Y-axis.

In this embodiment, a neuron firing distribution can be acquired near the medial canthi 511 and 512 and lateral canthi 509 and 510 of both eyes, the mouth corners 507 and 508, and the features 513 to 516 of the eyes and mouth. In this embodiment, the acquired distribution will be called an intermediate output distribution or detection output distribution.

The first layer level 402 in FIG. 4 detects first feature information as the lowest-order feature related to the features of a face. The face detection neural network used in this embodiment has eight, first to eighth detection modules 402a in the first layer level 402. The first feature information extracted here can be edge information about, for example, a luminance change or line segment direction.

The second layer level 403 detects V-shaped edges and line segment edges. More specifically, the second layer level 403 outputs output distributions such as a right-open V-shaped edge detection output distribution, left-open V-shaped edge detection output distribution, line segment edge 1 detection output distribution, and line segment edge 2 detection output distribution.

A right-open V-shaped edge is a V-shaped edge having an opening on the right side. 5b in FIG. 5 shows a detection output distribution obtained upon detecting right-open V-shaped edges. A left-open V-shaped edge is a V-shaped edge having an opening on the left side. 5c in FIG. 5 shows a detection output distribution obtained upon detecting left-open V-shaped edges. Line segment edge 1 is an edge formed based on a decrease change of a predetermined amount or more, which is detected by scanning a change in luminance value in the Y-axis positive direction. 5d in FIG. 5 shows a detection output distribution obtained upon detecting line segment edges 1. Line segment edge 2 is an edge formed based on a decrease change of a predetermined amount or more, which is detected by scanning a change in luminance value in the Y-axis negative direction. 5e in FIG. 5 shows a detection output distribution obtained upon detecting line segment edges 2.

The V-shaped features are effective in detecting the left and right mouth corner features 507 and 508, the left and right lateral canthus features 509 and 510 of the eyes, and the left and right medial canthus features 511 and 512 of the eyes. Line segment edge 1 and line segment edge 2 are effective in detecting the upper and lower eyelids 513 and 514 of the eyes and the upper and lower lips 515 and 516.

The third layer level 404 outputs an eye detection output distribution and a mouth detection output distribution based on the feature detection result in the second layer level 403. The eye detection output distribution indicates the distribution of pixels corresponding to eyes in the features of the face and corresponds to a region specified by the above-described lateral canthi 509 and 510, medial canthi 511 and 512, and eyelids 513 and 514. 5f in FIG. 5 shows an example of the eye detection output distribution according to this embodiment. The mouth detection output distribution indicates the distribution of pixels corresponding to the mouth portion in the features of the face and corresponds to a region specified by the above-described mouth corner points 507 and 508 and lips 515 and 516. 5g in FIG. 5 shows an example of the mouth detection output distribution according to this embodiment.

The final fourth layer level 405 outputs a face detection output distribution based on the eye and mouth detection result in the third layer level 404. The face detection output distribution indicates the distribution of positions corresponding to the center of the face based on the layout of the eyes and mouth and is specified by the above-described eye detection output distribution and mouth detection output distribution. 5h in FIG. 5 shows an example of the face detection output distribution according to this embodiment.

A series of detection output distributions generated in the face detection step (step S302) using the face detection neural network has been described above.

In step S304, an image parameter estimation unit 204 calculates an area Sp of the detection output distributions calculated by the object detection unit 203. The face detection output distribution shown in 5h is used to calculate the area Sp. The area Sp can be calculated based on a distribution containing, for example, a neuron firing status value of 0.9 or more.

In step S305, the image parameter estimation unit 204 determines whether the area Sp calculated in step S304 belongs to a predetermined range. The predetermined range can be, for example, the range of $(10\pm1 \text{ (pixels)})^2$. This value is merely an example. The range can be defined based on predetermined rules related to the face detection output distribution in the face recognition system.

If it is determined that the area Sp of the face detection output distribution does not fall within the predetermined range ("NO" in step S305), the process advances to step S306. If it is determined that the area Sp falls within the predetermined range ("YES" in step S305), the process advances to step S308.

In step S306, the image parameter estimation unit 204 sets histogram correction parameters. In this histogram correction parameter setting process, upper and lower threshold luminance values to apply linear interpolation in this embodiment are set as the histogram correction parameters based on the process result in step S305. In step S307, an image correction unit 205 executes known histogram correction for the input image by using the histogram correction parameters set in step S306.

Figure 6:
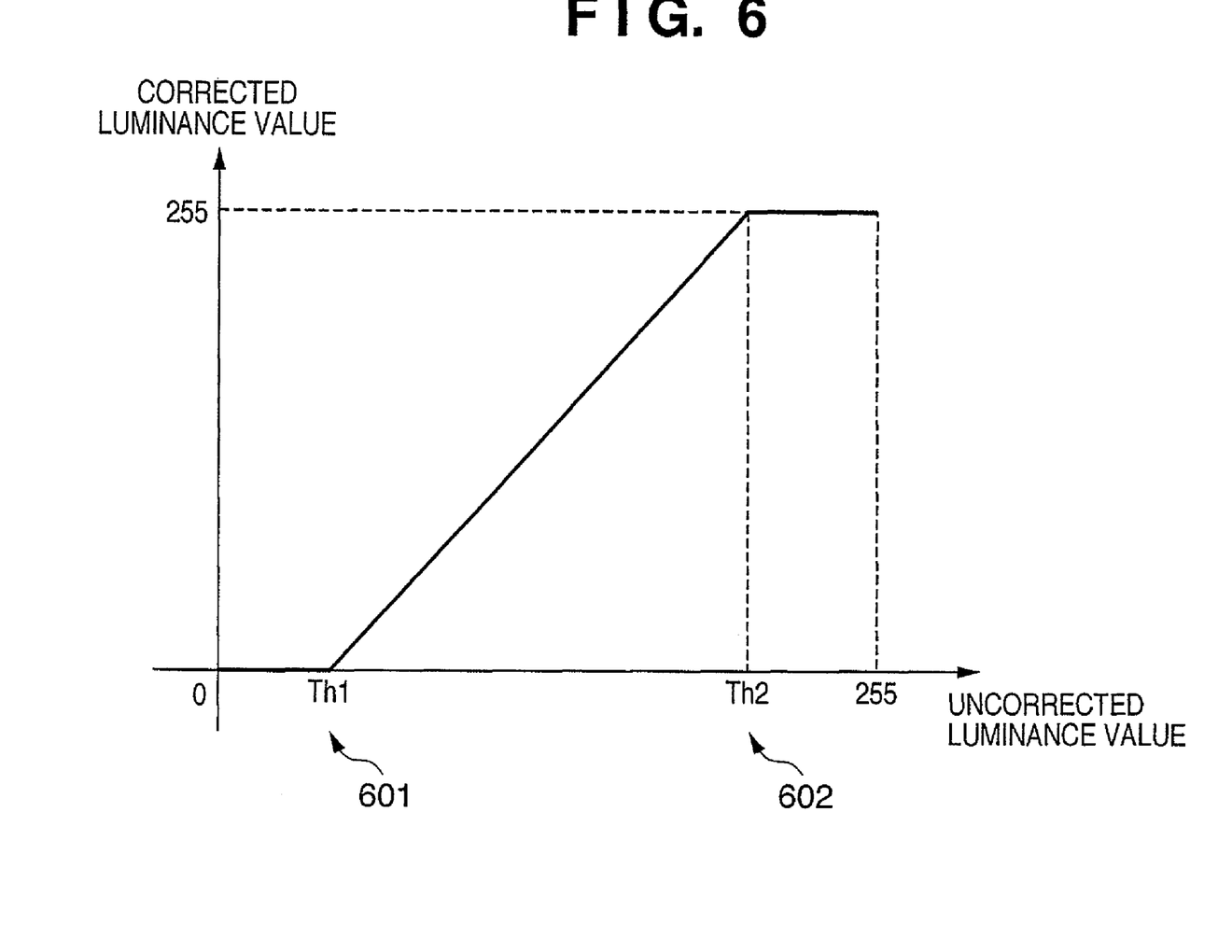
FIG. 6 is a graph for explaining the concept of histogram correction according to the first embodiment of the present invention.

The processes in steps S306 and S307 will be described below in detail. FIG. 6 is a graph for explaining the histogram correction parameter setting process. In this embodiment, luminance values less than or equal to a lower threshold luminance value Th1 601 of the G (green) channel of the input image are set to 0. Luminance values greater than or equal to an upper threshold luminance value Th2 602 are set to 255. The data between the lower threshold luminance value Th1 and the upper threshold luminance value Th2 is linearly interpolated in the range of 0 to 255.

More specifically, let P be the uncorrected luminance value of a pixel of interest. A corrected luminance value P' is given by $P'=0$ when $P<Th1$, $P'=255$ when $P>Th2$, $P'=(P-Th1)*255/(Th2-Th1)$ when $Th1 \leq P \leq Th2$ The lower threshold luminance value Th1 and upper threshold luminance value Th2 indicate the luminance value range to which linear interpolation is applied. Hence, the lower threshold luminance value Th1 and upper threshold luminance value Th2 are set such that the area of the face detection output distribution falls within the predetermined range.

The contents of the histogram correction parameter setting process will be described below in more detail. First, images containing various kinds of image quality variations are input. The lower threshold luminance value Th1 and upper threshold luminance value Th2 are obtained in advance, which do not cause firing at points except the desired feature points in the series of detection output distributions shown in FIG. 5. For example, in the eye detection output distribution shown in 5f or mouth detection output distribution shown in 5g, upper and lower threshold luminance values which cause no firing at points except the eyes and mouth are calculated. This is because the eye or mouth region may contain a region which should not correspond to the eyes or mouth depending on the method of setting Th1 and Th2. Hence, Th1 and Th2 are set in a range within which there is no change in the eye or mouth detection output distribution.

In step S306, values which are lower than the thus calculated threshold values by 10% are set as the initial upper and lower threshold luminance values. Using the initially set upper and lower threshold luminance values, the luminance values of the input image are corrected by linear interpolation in step S307. The face detection unit executes face detection again in step S302 by using the corrected input image. The process up to step S305 is executed. If it is determined again that the area Sp calculated after the first correction does not fall within the predetermined range, the process advances to step S306 again. Assume that the area Sp is already sufficiently close to the predetermined range. In step S306, an increment of about 1% in the positive direction is added to the upper and lower threshold luminance values set by the first histogram correction. Luminance value correction in step S307 is executed again. In this way, resetting of the upper and lower threshold luminance values in step S306 is repeated until the area Sp of the face detection output distribution converges into the predetermined range.

In the above-described way, the area Sp of the face detection output distribution can be converged into the predetermined range.

In step S308, an object matching unit 206 determines the spatial layout of certain features (e.g., eyes and mouth) in the face region. To do this, a known template matching technique of obtaining a feature template by scan is applied. In this embodiment, the center of gravity of each of the eye and mouth detection output distributions is calculated by the face detection process in step S302, and the spatial layout of the eyes and mouth in the face region is determined.

In step S309 the object matching unit 206 determines the layout relationship of the features extracted in step S308. If the extracted feature coordinates are inappropriate for describing the target object ("NG" in step S309), the process branches to image input in step S300 instead of advancing to the next step. For example, if the two eyes are located on the lower side of the central position of the face region extracted in step S302, it can be determined that feature extraction is insufficient. However, this condition need not always be satisfied if the system admits input of a face image turned upside down.

Although this depends on the system use scene, it is necessary to determine matching of features based on the layout rules of features corresponding to the type of the target to be recognized.

Figure 7:
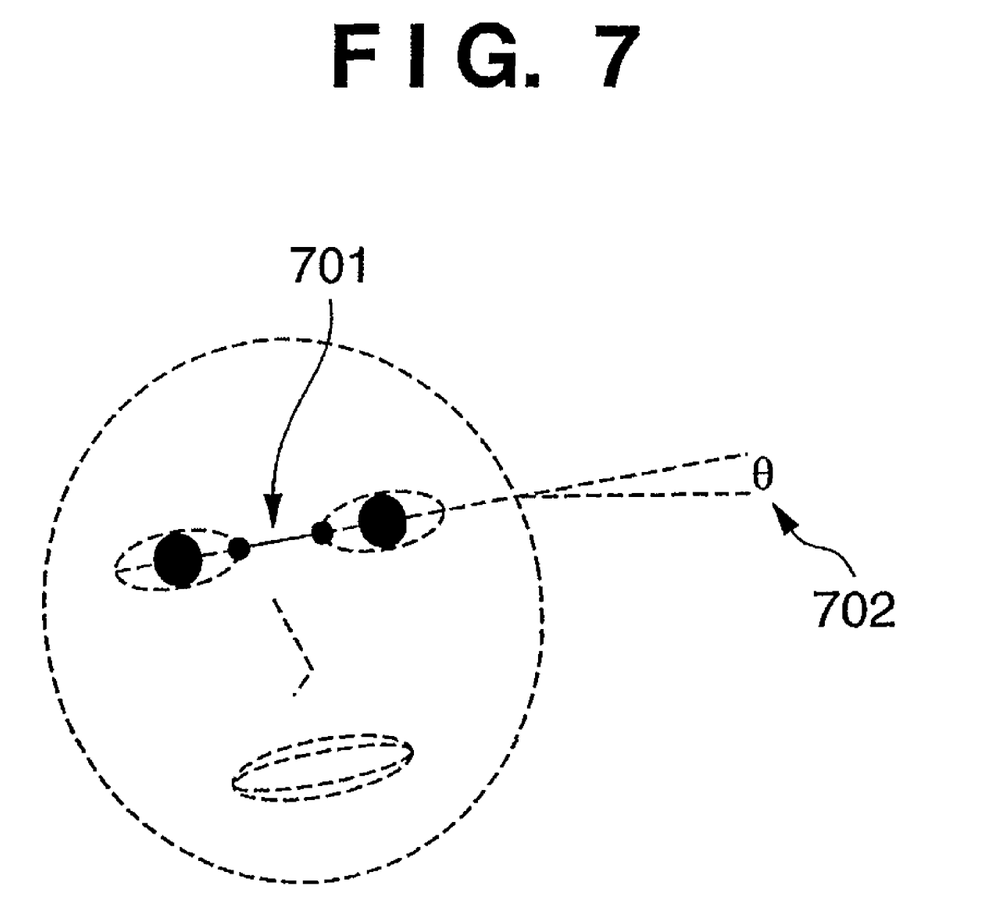
FIG. 7 is a view for explaining size normalization and rotation variations according to the first embodiment of the present invention.

In step S310, the object matching unit 206 normalizes the size and rotation of the image data. A known normalization method is usable for normalization. In this embodiment, for example, affine transformation is executed such that a distance 701 between medial canthi based on the medial canthus feature positions of eyes extracted in step S306 does not change between all images, as shown in FIG. 7. In place of the distance between medial canthi, the distance between the centers of gravity calculated in step S308 may be used. Simultaneously, an inclination 702 of a line connecting the medial canthi is calculated. Affine transformation correction considering rotation makes it possible to cope with an in-plane rotation variation.

In step S311, the object matching unit 206 causes a dictionary data comparison unit to compare dictionary data which learns the features of registrants. The dictionary data contains matching information about a registrant as the object to be matched. More specifically, in this embodiment, dictionary data in a face recognition system indicates a database having an image of a registrant to be recognized or feature space that characterizes a registrant. The object matching unit 206 holds this database. In this embodiment, the process shown in FIG. 3 is even applied to images used to generate dictionary data. An image from a process result is used as a dictionary data generation image for face recognition. Feature amounts necessary for face recognition are extracted from the image.

The dictionary data and unknown data are compared based on images with almost the same histogram condition. It is therefore possible to obtain a stable recognition result. The dictionary data comparison process in step S311 is executed by using a known matching technique. For example, a matching technique of obtaining, as a similarity, a correlation value by template matching between an input image and dictionary images and a statistical technique using principal component analysis, as described in "BACKGROUND OF THE INVENTION", are usable.

Figure 8:
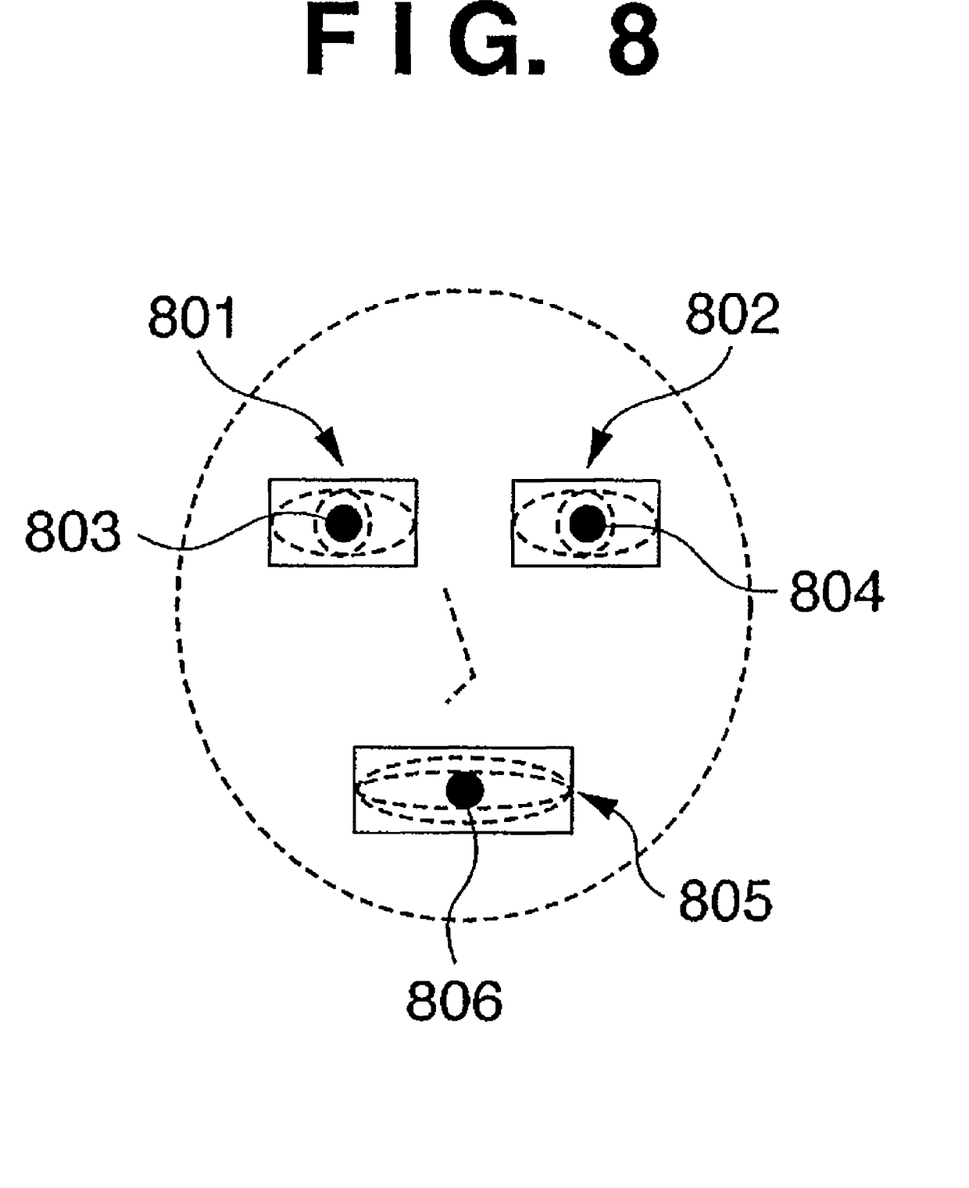
FIG. 8 is a view for explaining a local region setting method according to the first embodiment of the present invention.

In this embodiment, based on eye and mouth feature points 803, 804, and 806 extracted in step S309, local regions 801, 802, and 805 each having a predetermined size are set around the feature points, as shown in FIG. 8. The local regions correspond to feature parts such as the right eye, left eye, and mouth. These regions are cut out from the corrected input image.

Figure 9A:
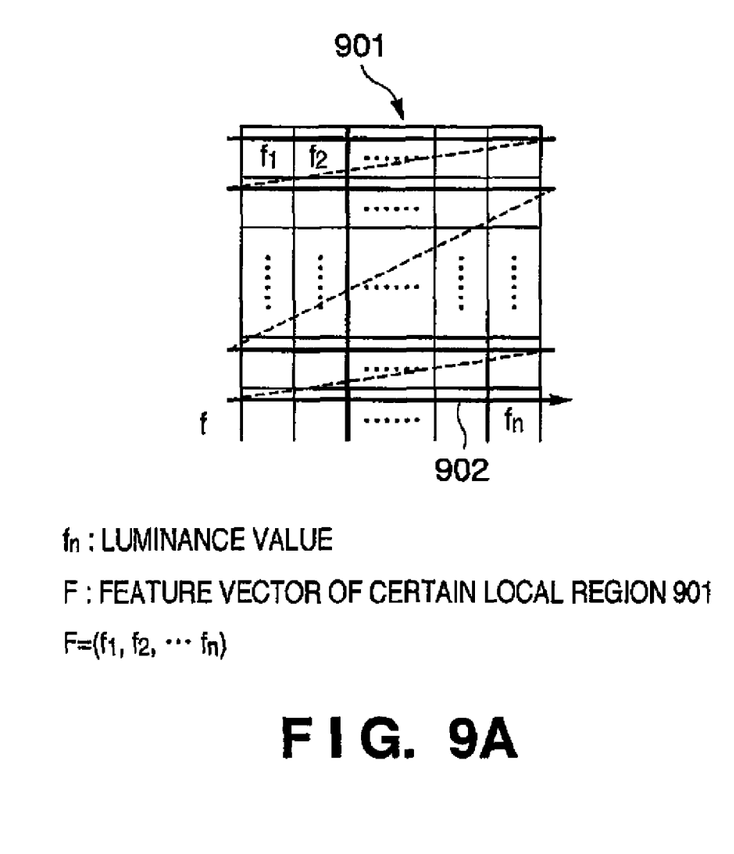
FIGS. 9A and 9B are views for explaining high-order feature vector generation according to the first embodiment of the present invention.

As shown in FIG. 9A, a luminance value fn in a cutout local region 901 is regarded as one-dimensional vector data F. In this case, $F=(f1, f2, \ldots, fn)$. Reference numeral 902 indicates a scan direction in the local region 901 to form the vector data F. A high-order feature vector Fh is further generated from vector data F1 to F3 generated for the right eye local region 801, left eye local region 802, and mouth local region 805. At this time, $Fh=(F1, F2, F3)$.

A support vector machine (to be sometimes abbreviated as SVM hereinafter) compares the generated high-order feature vector Fh with the dictionary data to perform pattern identification. The support vector machine will be described below.

The support vector machine is one of a number of known learning algorithms and is open to the public on the Internet. An example of the SVM is libsvm-2.5 which is open to the public at http://www.csie.mtu.edu.tw/~cjlin/libsvm. The libsvm shared object library has various clustering types and kernel functions. In this embodiment, a clustering type and kernel function called C-SVC using a cost variable is used as a linear function. A more detailed description will be omitted in this specification.

Figure 9B:
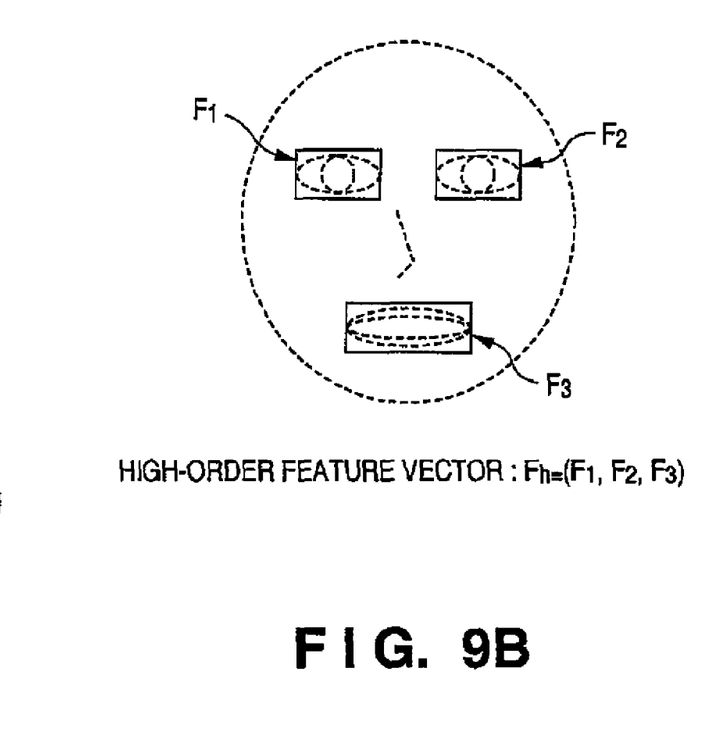

The flow of dictionary data generation according to this embodiment will be described below. As an assumption, image data of a registrant and image data of persons except the registrant are necessary. The same process as in steps S300 to S310 in FIG. 3 is executed for the image data, thereby generating the high-order feature vector Fh shown in FIG. 9B. The generated high-order feature vector Fh is associated with attribute information (e.g., information to identify the registrant) to generate a learning data file. The SVM learning algorithm is executed based on the learning data file by designating the clustering type and kernel function, thereby generating dictionary data.

The dictionary data will be described below in more detail. The dictionary data has a format with a plurality of "functions for two-class classification". For example, assume that there are four registrants which are classified into class A, class B, class C, and class D, respectively, and classes except the registrants are defined as class E. The "function for two-class classification" is a function for determining, based on a threshold value, which is likely, for example, A or B (a threshold value is generated for every two classes when generating dictionary data).

As described above, the dictionary data contains at least the identification information of each registrant, the high-order feature vector Fh, and the functions for two-class classification. All the functions for two-class classification are applied to the high-order feature vector Fh newly generated by face detection for input image data. In the above-described example, two-class classification is executed between all classes; in other words, A or B, A or C, A or D, A or E, B or C, .... The final class is decided by a majority process of the classification results. This allows specification of the person contained in the input image data as one of the registrants or an unregistered person.

As described above, according to this embodiment, an illumination condition of an image is estimated from the face detection output distribution based on the area of the shadow formed by the nose and corrected. This almost equalizes the illumination condition of an input image and that of a dictionary image and enables image matching under the same illumination conditions. It is therefore possible to provide a face recognition method robust to illumination variations.

In the above embodiment, histogram correction is executed for an input image and a face image to be registered. However, instead of executing histogram correction for the face image to be registered, only the input image may undergo histogram correction so that it almost matches the histogram distribution of the registered face image. In this case, the histogram distribution of the registered face image is used as the above-described predetermined range.

Second Embodiment

The second embodiment is also related to a face recognition system, like the first embodiment. In the first embodiment, a local region based on a feature point is extracted from an original image that has undergone histogram correction and matched. As a characteristic feature of the second embodiment, intermediate output distributions in the face detection process in step S302 in FIG. 3 are matched with each other.

The concept of this embodiment is that the area of the neuron firing distribution of a face detection output distribution ($5h$) with respect to an intermediate output distribution to be used for matching exceeds a predetermined threshold value, as in the first embodiment.

Figure 10:
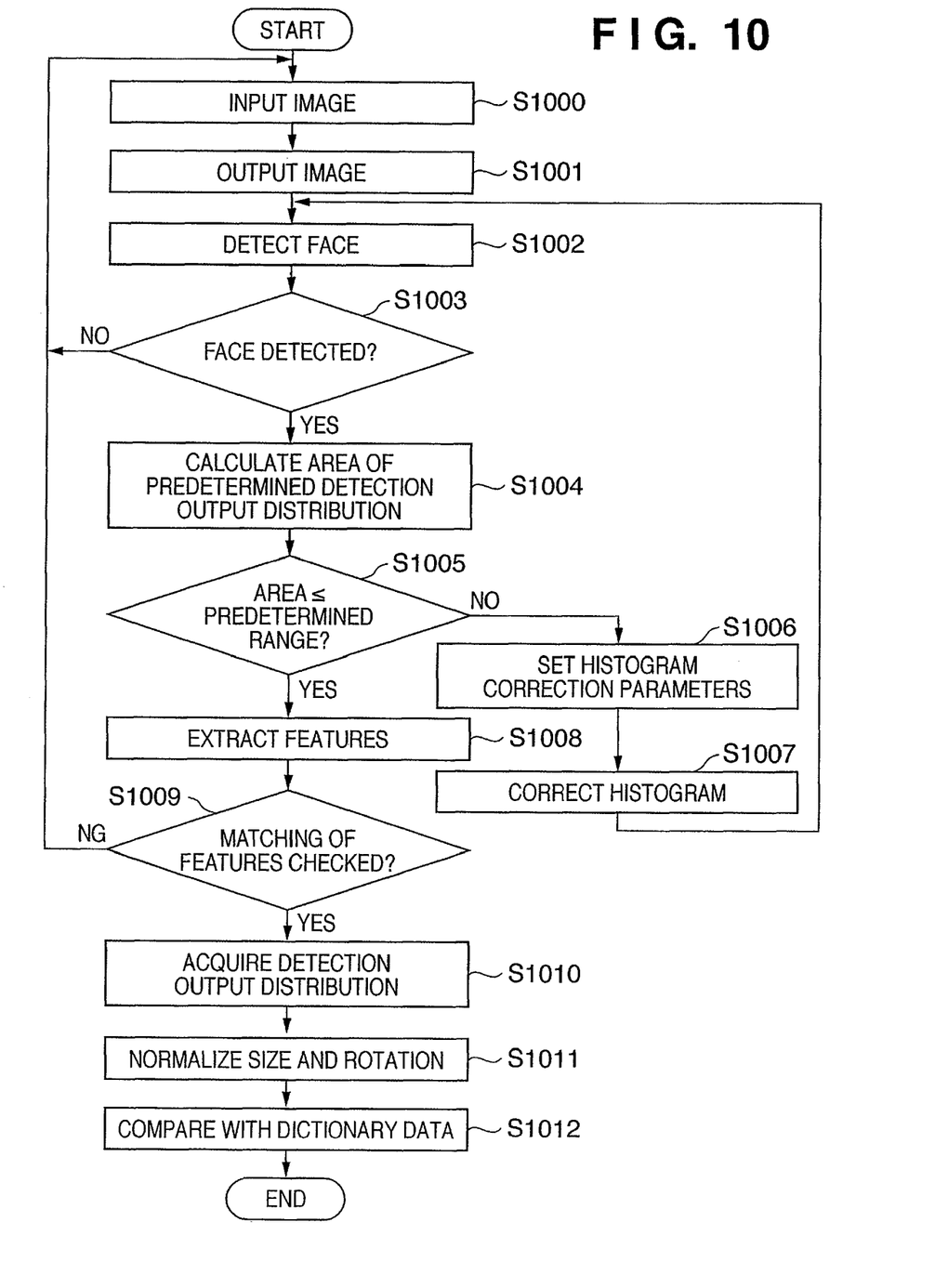
FIG. 10 is a flowchart illustrating details of an example of an image matching process according to the second embodiment of the present invention.

FIG. 10 shows a face recognition process flow based on a detection output distribution of face detection according to the second embodiment. This process flow is different from that of the face recognition system of the first embodiment in that a process related to detection output distribution acquisition in step S1010 is added. Steps S1000 to S1009 correspond to steps S300 to S309 in FIG. 3 of the first embodiment.

In step S1010, an object matching unit 206 acquires detection output distributions (5b to 5h) generated in step S1002. The latest detection output distribution and a series of detection output distributions when the area of the face detection output distribution falls within a predetermined range can easily be acquired by ensuring them in the main storage area (e.g., RAM) of the apparatus while always updating them.

In step S1011, the object matching unit 206 normalizes the size and rotation for the detection output distribution acquired in step S1010 based on the feature points extracted in step S1008. The normalization can be done by using the same method as described in the first embodiment with reference to FIG. 6. In step S1012, the object matching unit 206 compares the data with dictionary data formed from detection output distributions of the same type. The comparison method can be the same as in the first embodiment.

As described above, according to this embodiment, face recognition can be done by matching the intermediate output distributions in the face detection process. Even at this time, the illumination condition of an image is estimated from the face detection output distribution based on the area of the shadow formed by the nose and corrected. This almost equalizes the illumination condition of an input image and that of a dictionary image and enables image matching under the same illumination condition. It is therefore possible to provide a face recognition method robust to illumination variations.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-234360, filed Aug. 30, 2006, which is hereby incorporated by reference herein in its entirety.

What is claimed is:
1. An image matching apparatus comprising:
a computer-readable memory constructed to store computer-executable process steps; and
a processor constructed to execute the computer-executable process steps stored in the memory;
wherein the process steps stored in the memory cause the processor to perform:
a detector step of detecting, from an input image containing an object to be matched, a region where the object exists;
an estimation step of estimating a parameter regarding a luminance value based on an image of the region;
a correction step of correcting the luminance value of the input image based on the parameter; and
a matching step of matching the corrected input image containing the object to be matched with an image containing a matching object,
wherein, said correction step corrects the luminance value of the image by:
changing a luminance value smaller than a first threshold value to a minimum luminance value,
changing a luminance value larger than a second threshold value to a maximum luminance value, and
linearly interpolating a luminance value located between the first threshold value and the second threshold value.

2. The apparatus according to claim 1, wherein the process steps stored in the memory further cause the processor to perform:
a calculation step of calculating an area of a distribution of detection output related to the region; and
a determination step of determining whether the area falls within a predetermined range,
wherein said correction step corrects the luminance value of the input image when said determination step determines that the area does not fall within the predetermined range.

3. The apparatus according to claim 1, wherein,
the object to be matched is a human face, and wherein said detection step comprises:
a first detection step of detecting a region where eyes and a mouth of the face are located; and
a second detection step of detecting, based on the region where the eyes and the mouth are located, a region where the face is located.

4. An image matching apparatus comprising:
a computer-readable memory constructed to store computer-executable process steps; and
a processor constructed to execute the computer-executable process steps stored in the memory;
wherein the process steps stored in the memory cause the processor to perform:
a detector step of detecting, from an input image containing an object to be matched, a region where the object exists;
an estimation step of estimating a parameter regarding a displaying characteristic based on an image of the region;
a correction step of correcting the displaying characteristic of the input image based on the parameter; and
a matching step of matching the corrected input image containing the object to be matched with an image containing a matching object,
wherein said matching step comprises:
an extraction unit step of extracting a specific region from the corrected input image;
a vector generation step of generating a feature vector based on the displaying characteristic of the specific region; and
a vector matching step of executing matching by a support vector machine using the feature vector and matching information registered in a registration unit.

5. The apparatus according to claim 4, wherein the specific region corresponds to eyes and a mouth when the object to be matched is a human.

6. An image matching method comprising:
using a computer to perform a detecting step of detecting, from an input image containing an object to be matched, a region where the object exists;
estimating a parameter regarding a luminance value based on an image of the region;
correcting the luminance value of the input image based on the parameter; and
matching the corrected input image containing the object to be matched with an image containing a matching object,
wherein the luminance value of the image is corrected by:
changing a luminance value smaller than a first threshold value to a minimum luminance value,
changing a luminance value larger than a second threshold value to a maximum luminance value, and
linearly interpolating a luminance value located between the first threshold value and the second threshold value.

7. The method according to claim 6, further comprising the steps of:
calculating an area of a distribution of detection output related to the region; and
determining whether the area falls within a predetermined range,
wherein the luminance value of the input image is corrected when it is determined in the determining step that the area does not fall within the predetermined range.

8. The method according to claim 6, wherein
the object to be matched is a human face, and wherein said detecting the region comprises:
detecting a region where eyes and a mouth of the face are located; and
detecting, based on the region where the eyes and the mouth are located, a region where the face is located.

9. An image matching method comprising:
using a computer to perform a detecting step of detecting, from an input image containing an object to be matched, a region where the object exists;
estimating a parameter regarding a displaying characteristic based on an image of the region;
correcting the displaying characteristic of the input image based on the parameter; and
matching the corrected input image containing the object to be matched with an image containing a matching object, wherein said matching the corrected input image with the image containing the matching object comprises:
extracting a specific region from the corrected input image;
generating a feature vector based on a luminance value of the specific region; and
executing matching by a support vector machine using the feature vector and matching information.

10. The method according to claim 9, wherein the specific region corresponds to eyes and a mouth when the object to be matched is a human.

11. A non-transitory computer-readable storage medium retrievably storing a computer program for causing a computer to function as an image matching apparatus which comprises:
a detector constructed to detect, from an input image containing an object to be matched, a region where the object exists;
an estimation unit constructed to estimate a parameter regarding a luminance value based on an image of the region;
a correction unit constructed to correct the luminance value of the input image based on the parameter; and
a matching unit constructed to match the corrected input image containing the object to be matched with an image containing a matching object,
wherein, said correction unit corrects the luminance value of the image by:
changing a luminance value smaller than a first threshold value to a minimum luminance value,
changing a luminance value larger than a second threshold value to a maximum luminance value, and
linearly interpolating a luminance value located between the first threshold value and the second threshold value.

12. A non-transitory computer-readable storage medium retrievably storing a computer program for causing a computer to function as an image matching apparatus which comprises:
a detector constructed to detect, from an input image containing an object to be matched, a region where the object exists;
an estimation unit constructed to estimate a parameter regarding a displaying characteristic based on an image of the region;

a correction unit constructed to correct the displaying characteristic of the input image based on the parameter; and a matching unit constructed to match the corrected input image containing the object to be matched with an image containing a matching object, wherein said matching unit comprises:

an extraction unit constructed to extract a specific region from the corrected input image;

a vector generation unit constructed to generate a feature vector based on the displaying characteristic of the specific region; and a vector matching unit constructed to execute matching by a support vector machine using the feature vector and matching information registered in a registration unit.

* * * * *